May 31, 1960 J. L. MAHONEY ET AL 2,938,473
AIR AGITATION SYSTEM FOR BAKING OVENS
Filed March 26, 1956 4 Sheets-Sheet 1
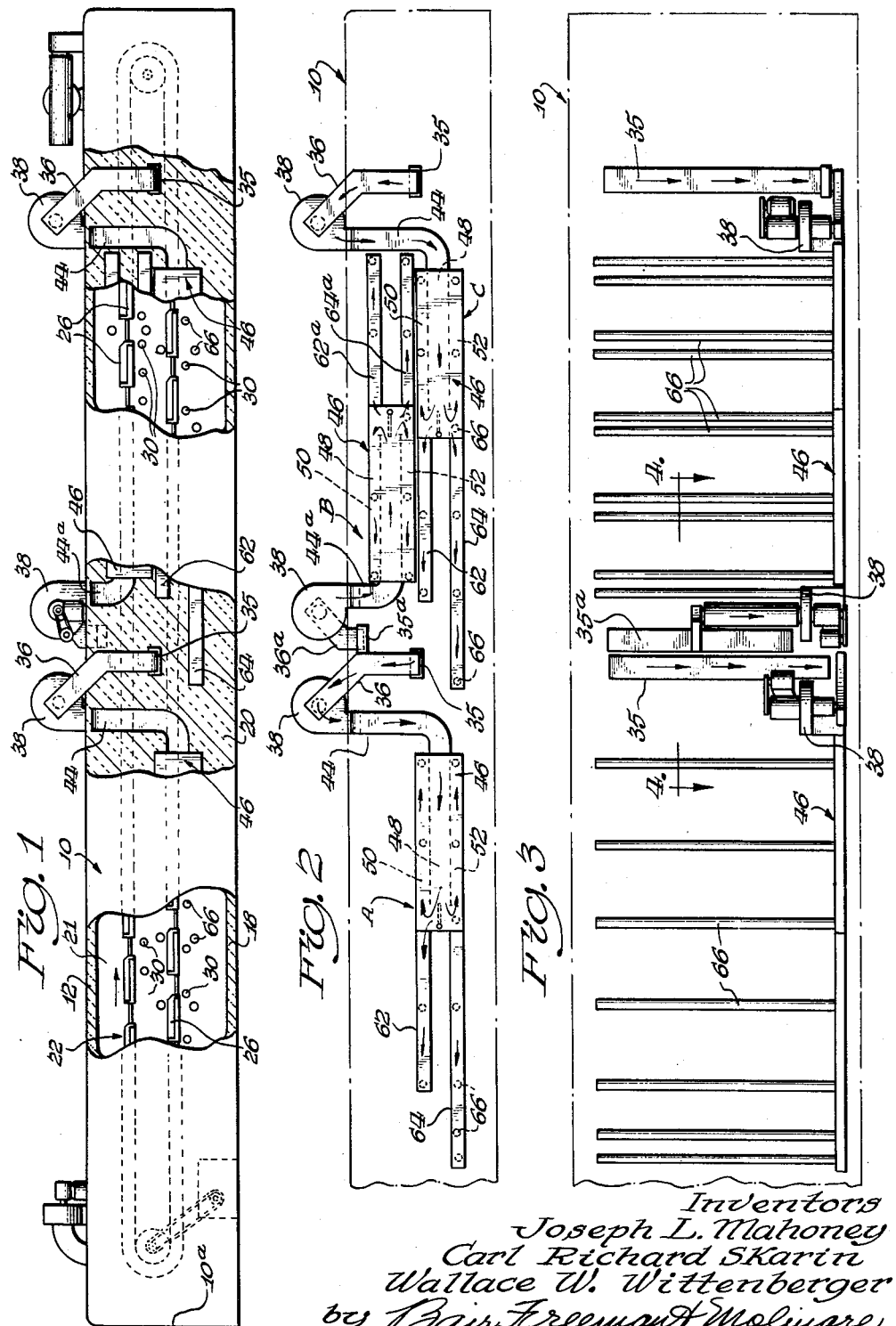
Inventors
Joseph L. Mahoney
Carl Richard Skarin
Wallace W. Wittenberger
by Bair, Freeman & Molinare
Attorneys

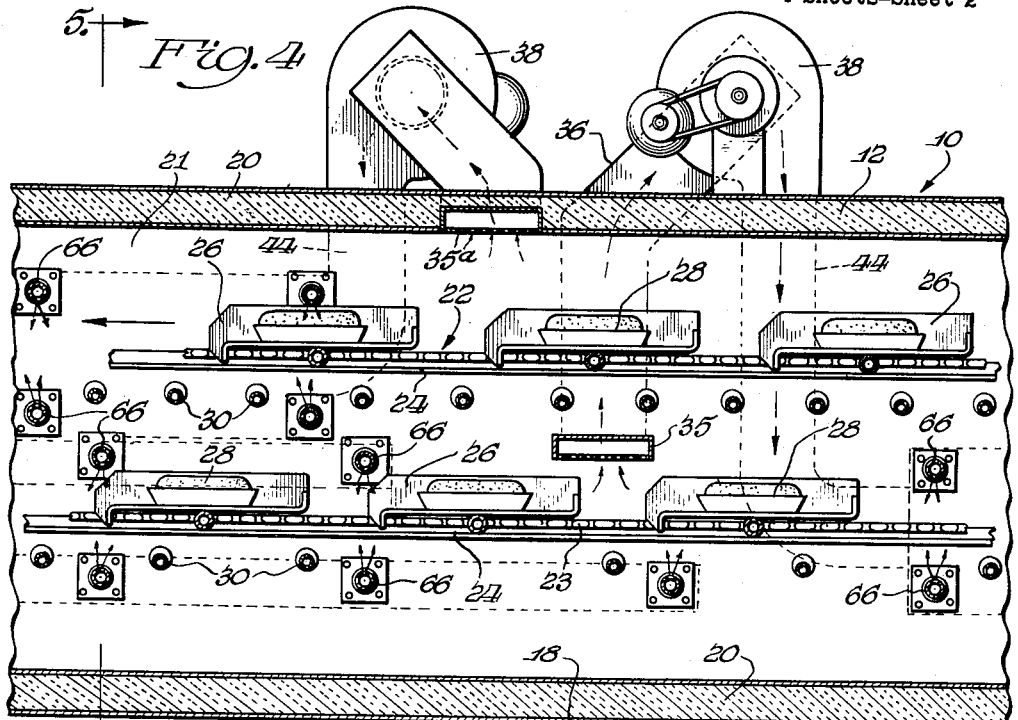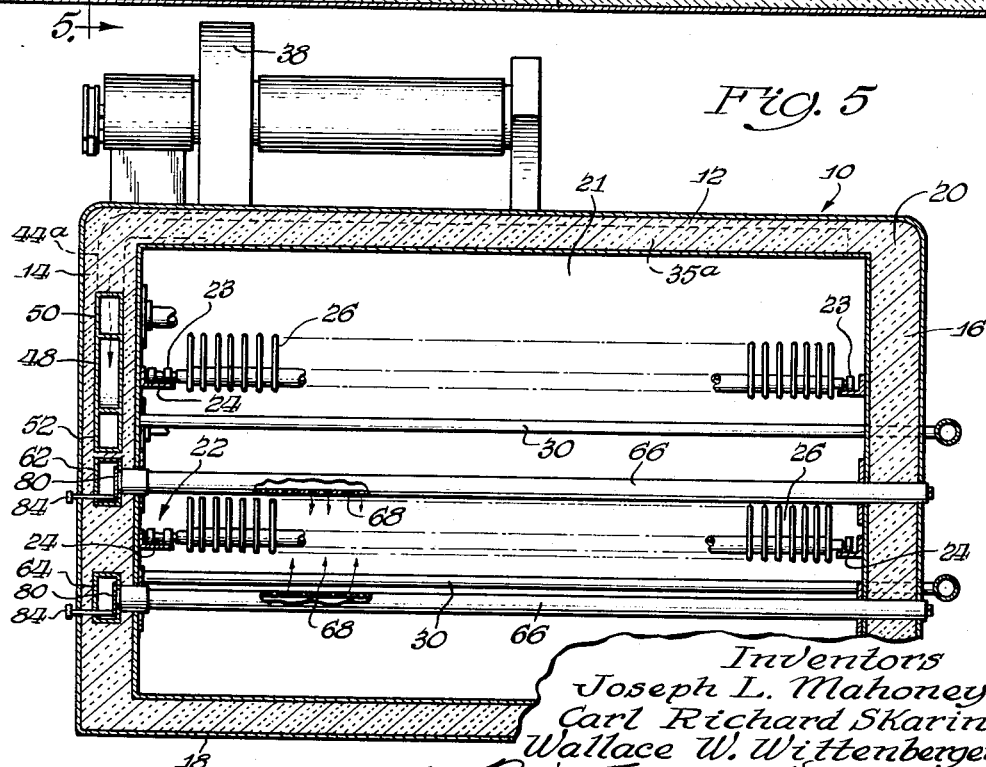

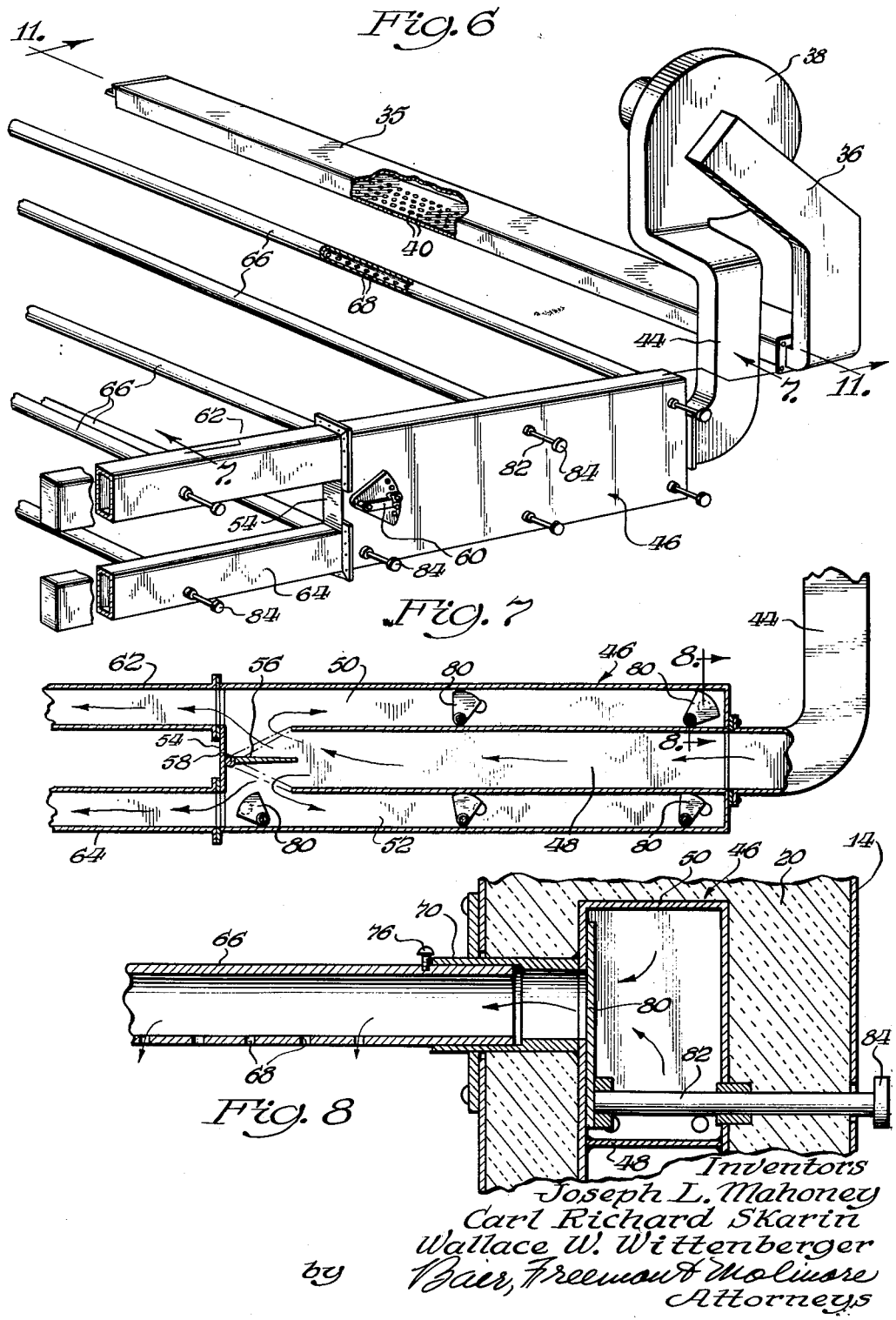

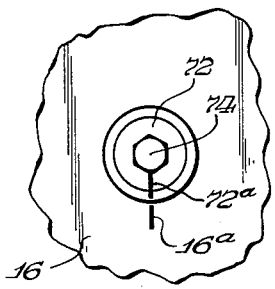
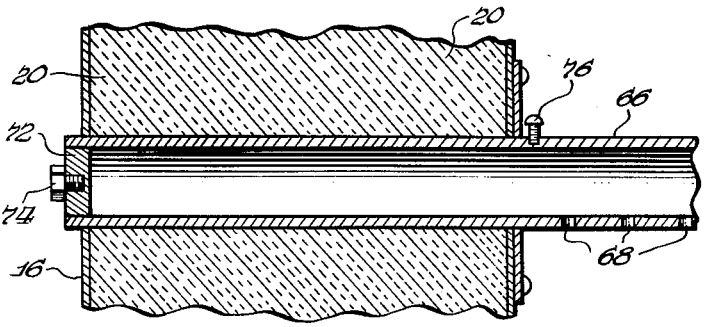
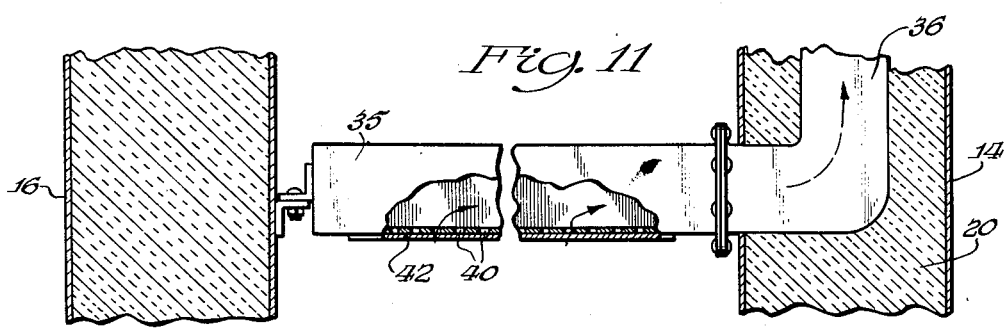
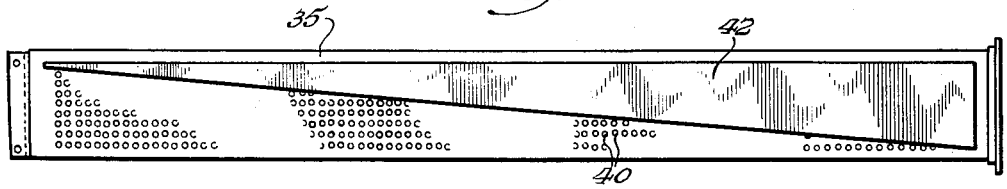
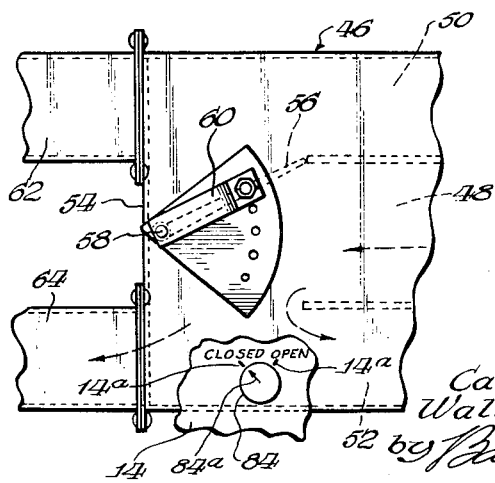

United States Patent Office 2,938,473
Patented May 31, 1960

2,938,473

AIR AGITATION SYSTEM FOR BAKING OVENS

Joseph L. Mahoney, Elmhurst, Carl R. Skarin, Western Springs, and Wallace W. Wittenberger, Elmhurst, Ill., assignors, by mesne assignments, to Baker Perkins, Inc., Saginaw, Mich., a corporation of New York Filed Mar. 26, 1956, Ser. No. 573,698

14 Claims. (Cl. 107—55)

This invention relates to air circulating and air agitating apparatus for commercial baking ovens of the type including a continuously traveling conveyor for transporting foodstuffs, such as bread, pastry and the like, in a predetermined path, through the baking chamber of the oven.

It has long been recognized that the matter of circulation and agitation of the heated air and gases in the baking chamber of a baking oven are of great importance in obtaining efficient and satisfactory baking of foodstuffs, as well as in obtaining desired coloring and browning of the foodstuffs, such as bread. The temperature of the heated air and gases, and the circulation and agitation of the air and gases in a baking chamber, desirably should be constantly controlled in order to insure proper baking of various foodstuffs.

The novel air circulating and agitating apparatus embodying the present invention contemplates the provision of an air intake duct comprising a header opening directly into the baking chamber at one end of a zone in the baking chamber, and the opposite end of the duct being attached to a suction-blower. It is to be understood that the air in the baking chamber is heated to a desired temperature, either directly or indirectly, by suitable heating apparatus. The heated air is withdrawn from the baking chamber, through the intake duct, into the suction-blower, and is discharged under pressure into a distributing duct, which is directly connected to one or more series of individual blowing tubes, extending transversely of the baking chamber and arranged in a bank above and/or below the path of travel of the foodstuffs moving through the baking chamber. The blowing tubes are provided with a series of openings through which the heated air, under pressure, is discharged in jet form toward, around and upon the foodstuffs as they are moving through the baking chamber. The distributing duct and blowing tubes, together with the header of the intake duct, are provided for zone control and the header may be located either ahead or following the location of the distributing duct and blowing tubes.

By virtue of this arrangement, the heated air is withdrawn from one portion of a zone to be controlled in the baking chamber and discharged into another portion of said zone. Suitable damper means is provided for selectively discharging air from the blowing tubes arranged above and/or tubes arranged below the path of travel of the foodstuffs. Suitable damper means is provided for each individual blowing tube so as to afford maximum selective control for discharging of the heated air, under pressure, from the suction-blower, into a desired zone or portion of the baking chamber. Desirably, but not necessarily, each of the blowing tubes is mounted for individual rotation to permit the jets of air under pressure to discharge in a desired direction, to suit the requirements of the specific food product being baked.

By reason of the damper arrangement provided for each individual tube, it is possible, by proper adjustment of the dampers, to obtain the desired volume and degree of air agitation in a particular zone of the baking chamber. The openings provided in the blowing tubes are so located as to insure even distribution of the air across the entire width of the baking chamber to insure uniform baking of the food products. The jets of air being discharged from the blowing tubes being under substantial pressure, causes substantial agitation of the air within the baking chamber and insures uniform distribution of heat against and around the food products traveling through a zone of the baking chamber.

The air agitating and circulating apparatus is capable of use in baking ovens of either the direct fired, or indirect fired, types. The apparatus is of such nature as readily permits adjustment and control of air agitation and circulation in a manner to obviate difficulties that frequently present themselves with respect to non-uniform heat or non-uniform circulation of air in certain areas of the baking chamber due to the character of the heating system, or due to the type of baking required, or the character of the trays employed in connection with the oven conveyor, or other special constructional features embodied in an oven as may be required by certain bakers for certain baking operations.

One of the objects of this invention is to provide a novel air agitating and circulating apparatus for a baking oven which permits obtaining selective and efficient agitation of the heated air and gases in the baking chamber, around and upon the food products being baked.

Another object is to provide a novel air agitating and circulating apparatus for the heated air and gases in the baking chamber of an oven, in a manner so as to insure uniform heat distribution, efficient and uniform baking, coloring and browning of the exposed portions of the food products being baked.

A further object is to provide a novel air agitating and circulating apparatus which permits obtaining selective control of a multiplicity of small zones within a main zone of baking chamber for obtaining efficient and uniform baking of food products of certain characteristics.

Still another object is to provide a novel air agitating and circulating apparatus for a baking oven wherein heated air is caused to be selectively discharged across the baking chamber of the oven, above and/or below the food products as they move through the baking chamber.

A still further object is to provide a novel air agitating and circulating apparatus wherein heated air is caused to be selectively discharged uniformly across the baking chamber, through a series of ducts positioned above and below the path of travel of the food products in the baking chamber, and wherein each duct is provided with an individual damper, controlled externally of the oven, to permit obtaining relatively fine zone control of the heated air being discharged on or around the food products.

Still another object of this invention is to provide a novel air agitating and circulating apparatus comprising a series of blowing ducts arranged above and/or below the path of travel of the food products traveling through the baking chamber, and wherein said ducts are mounted for individual rotation, from the exterior of the oven, to alter the direction of air streams discharged from said ducts to meet the requirements of the specific food product being baked.

Still a further object is to provide a novel air agitating and circulating apparatus wherein fine control of circulation of the heated air may be maintained on and around food products traveling through a plurality of zones of the baking chamber, to insure obtaining desired baking conditions for the specific character of the food products being baked.

And a still further object of this invention is to provide a novel air agitation and circulating apparatus which permits obtaining fine control of the heat and circulation of air around the food products for insuring uniformity of baking of the food products and, at the same time, effect a reduction in the time required for normally performing such baking operations.

Other objects and advantages of this invention will be apparent from the following description taken in connection with the accompanying drawings, in which:

Figure 1 is a view in side elevation of a baking oven, with portions broken away to represent in outline portions of the novel air agitating apparatus constituting the present invention.

Figure 2 is a side elevational view, in outline form, of a plurality of air agitating apparatuses embodying the present invention, arranged as a system for obtaining zone control of the baking chamber of an oven.

Figure 3 is a top plan view of the apparatuses represented in Figure 2.

Figure 4 is an enlarged, fragmentary vertical view, taken longitudinally of the baking oven, substantially as indicated at line 4—4 on Figure 3.

Figure 5 is an enlarged, transverse sectional view through the oven, taken substantially as indicated at line 5—5 on Figure 4.

Figure 6 is a perspective view of the air agitating apparatus embodying the present invention.

Figure 7 is a vertical sectional view through the distributor duct, taken substantialy as indicated at line 7—7 on Figure 6.

Figure 8 is an enlarged, sectional view, taken substantially as indicated at line 8—8 on Figure 7, showing one of the blowing tubes in section, and its relation to the distributing duct.

Figure 9 is a sectional view of the end portion of a blowing tube, opposite the end shown in Figure 8.

Figure 10 is a fragmentary end elevational view from the exterior of the oven, showing means for rotating the tube.

Figure 11 is a transverse sectional view through the air intake header, taken substantially as indicated at line 11—11 on Figure 6.

Figure 12 is a bottom plan view of the air intake header.

Figure 13 is an enlarged, fragmentary view, in side elevation, of an end portion of the distributing duct.

It is to be understood that the air agitating and circulating apparatus of the present invention is suitable for use in connection with either direct fired, or indirect fired, baking ovens and, as represented in the drawings, the oven shown is of the direct fired type.

The baking oven, indicated generally at 10, is of rectangular shape, having a top wall 12, side walls 14 and 16, and a bottom wall 18, which walls are made up of a pair of spaced apart sheet metal panels, between which panels is interposed suitable heat insulating material indicated at 20. The walls of the oven define a baking chamber 21, in which is located a suitable conveyor, indicated generally at 22, which, as shown, is of the single lap type. The conveyor comprises a pair of spaced apart strands of chain 23, movable along tracks 24 mounted on the interior of the side walls of the oven. A series of longitudinally spaced apart trays indicated at 26, are carried by the respective strands of chain, and extend substantially across the baking chamber 21, as may be seen in Figure 5 of the drawings. These trays may be of various forms, depending upon the character of the foodstuffs to be baked. As shown, the trays are of the grille type and serve to support food products thereon and, as herein shown, pans of bread as indicated at 28. The conveyor may be driven in any suitable manner and, as shown, may be considered to embody an upper run and a lower run. The forward end of the oven, as indicated at 10a, is provided with a suitable opening (not shown) to afford access to the trays of the conveyor for loading of the foodstuffs onto the trays. The trays of foodstuffs are unloaded at the front end of the oven, either by manual removal of the foodstuffs from the trays, or by suitable mechanism (not shown) for automatically discharging the baked foodstuffs from the trays, prior to the trays registering at the loading opening at the front of the oven.

The baking chamber is heated to a desired temperature, depending upon the character of the foodstuffs being baked, by means of a plurality of individual, fluid fuel burners, indicated at 30, which burners extend across the baking chamber, as seen in Figure 5 of the drawings, and which are arranged in rows below each of the respective runs of the conveyor, as seen in Figure 4 of the drawings.

In the novel air agitating and circulating apparatus, it is possible to obtain full control as to the direction and amount of air flow, and relative position or zone of agitation of the air in the baking chamber. As represented in Figures 1 and 2 of the drawings, we employ three separate sets of air agitating and circulating apparatuses to provide three separate zones in which we obtain relatively minute control of agitation and circulation of the heated air in the baking chamber. As may be seen in Figures 1 and 2 of the drawings, one of the apparatuses, indicated at A, is arranged for controlling a zone comprising the front portion of the baking chamber in association with the lower run of the conveyor. Two other separate apparatuses, as indicated at B and C, as seen in Figures 1 and 2, are arranged and located for controlling circulation of air in two other zones, at rear portions of the baking chamber, in association respectively with the upper and lower runs of the conveyor.

Normally, but not necessarily, agitation of air is not provided in approximately the first 25 percent of the length of travel of the food products through the baking chamber. Hence, the three separate apparatuses, designated generally at A, B and C, are provided located and arranged in the baking chamber so as to provide, for control of air agitation and circulation during the remaining 75 percent of travel of the food products through the baking chamber.

For convenience, we will now describe in detail the apparatus located and arranged for controlling the zone at the forward portion of the baking chamber in association with the lower run of the conveyor. The apparatus comprises an air intake header 35, connected to one end of an intake duct 36, located in the oven side wall 14, and the opposite end of said duct 36 is connected to the inlet side of a suction-blower 38. The header 35, as seen in Figures 11 and 12 of the drawings, is of elongated form and extends substantially across the width of the oven chamber. The underside of the header is formed with a multiplicity of inlet openings 40, throughout the major area of its bottom surface. A portion of the bottom surface of the header is covered by a plate 42 which is secured to the header in any convenient manner, such as by bolts, rivets or by welding, and is so positioned as to expose an increasingly large number of inlet apertures, commencing adjacent the end connected to the duct 36, and extending toward the opposite end thereof. The purpose of this gradually increasing effective cross-sectional area of inlet duct openings, is to provide a substantially uniform withdrawal of heated air from the baking chamber across the entire width of the baking chamber.

An air outlet duct 44, is connected at one end to the outlet side of the suction-blower, and the opposite end of said duct is connected to a longitudinally extending distributing duct 46, both the ducts 44 and 46 being located within the side wall 14 of the oven, as clearly seen in the drawings. The distributor duct is located substantially in central vertical relation with respect to the bottom run of the conveyor 22, and includes a main, elongated inlet duct portion 48, in direct communication with the outlet duct 44, and two elongated outlet duct portions 50 and 52 arranged above and below, respectively, said main inlet duct portion 48. The partition walls separating the inlet duct portion 48 from outlet duct portions 50 and 52, terminate short of an end wall 54 of the distributing duct, so that heated air traveling through the inlet duct 48 may discharge into either or both of the outlet duct portions 50 and 52 under control of a damper 56, as clearly seen in Figures 7 and 13 of the drawings. The damper is mounted on a pivot rod 58, which extends through the side wall 14 of the oven, and the outer end of said rod extends beyond the outer surface of the side wall of the oven, to which end is attached a handle 60. Said handle may be conveniently manipulated by an operator so as to selectively position the damper centrally, as seen in Figure 7 of the drawings, so that the heated air may be discharged from the main inlet duct portion 48, into both of the outlet duct portions 50 and 52, or the handle may be adjusted so as to position the damper 56, as shown in dot-and-dash outlines in Figure 7, at either an upper or lower position for selectively closing off the passageway respectively from the main inlet duct portion 48 to the outlet duct portion 50, or the outlet duct portion 52.

Connected into the end wall 54 of the distributing duct, are upper and lower outlet ducts 62 and 64, extending longitudinally, which are connected so as to constitute extensions of outlet duct portions 50 and 52 respectively. As may be seen in the drawings, the outlet ducts 50—62 and 52—64, are also arranged in the side wall 14 of the oven, in planes disposed above and below the lower run of the conveyor.

The distributor duct and extension ducts 62 and 64, are provided with two series of blowing tubes or ducts indicated at 66, extending transversely of the baking chamber, and positioned respectively above and below the lower run of the conveyor, as seen in the drawing. Each blowing duct is provided with series of longitudinally spaced apart openings 68, arranged in a row. These blowing ducts or tubes are mounted in open communication at one end, with respect to the outlet ducts 50—62 and 52—64, so as to permit discharging, under pressure, of heated air through said blowing ducts toward and around the foodstuffs as they are traveling along the lower run of the conveyor. The open end of each blowing duct, as seen in Figure 8, is mounted in a tubular sleeve 70, fixedly secured in the side wall 14, to provide direct communication with said outlet ducts 50—62 and 52—64. The opposite end of each blowing tube is closed by a plug 72, and said end is journaled supported in the opposite wall 16 of the oven. The closed end of the blowing duct or tube projects beyond the side wall, as seen in Figure 10, and the plug 72 is provided with a headed element 74, adapted to be engaged by a suitable tool to rotate the blowing tube to any desired angular position of adjustment, by virtue of which air discharged through the openings 68 is caused to be directed toward, upon or around the foodstuffs, at a desired angle, such as perpendicularly thereto, or either forwardly or rearwardly with respect to the direction of travel of the foodstuffs on the conveyor, in order to obtain desired baking characteristics. Set screws 76 are secured in each of the tubes to limit axial movement of the blowing tubes 66, when mounted in position.

The outer end of each blowing tube 66, and the outer surface of the wall 16, of the oven are provided with index marks 72a and 16a, as seen in Figure 10 of the drawings, so that it can be determined whether or not the openings 68 in the blowing tube are adjusted for discharging jets or streams of heated air in a desired direction to suit the requirements of the specific product being baked. When the two markers are in alignment, the openings in the blowing tube are positioned for discharging jets of heated air perpendicularly to the food products as they travel along the conveyor.

Each of the blowing tubes 66, is controlled by a separate damper, as indicated at 80, for controlling the open end of said tube. Said damper is mounted on a pivot rod 82, journal supported in the oven wall 14, with the outer end portion thereof projecting beyond the outer surface of the wall 14, and provided with a control knob 84. The dampers for the blowing tubes may be selectively adjusted to either an open or closed position, or to any desired intermediate position, with respect to the opening in the journal 70, in direct communication with the blowing tube 66, as clearly seen in the drawings. For convenience in making such adjustment the knob 84 and outer surface of the wall 14 of the oven are provided with index marks, 84a and 14a respectively. By virtue of this arrangement, it is possible to obtain a wide range of control for supplying of the heated air, for discharge through certain of the blowing tubes in order to obtain desired baking characteristics. In effect, this arrangement provides a large number of relatively small zones, which may be individually controlled, in a main zone of a baking chamber of an oven.

While we have described specifically one complete air agitating apparatus for use in connection with a portion of the lower run of the front portion of the baking chamber, and which may be understood to constitute one zone, we have also provided separate sets of air agitating apparatuses, indicated at B and C, for two other zones, for the upper run and lower runs of the conveyor, at a rearward portion of the baking chamber. It is to be understood that the apparatus indicated generally at C is identical in all respects with respect to the apparatus hereinabove described in detail and designated at A, while the apparatus designated at B is slightly modified and disposed in opposite end-to-end relation as compared to apparatus A. Apparatus B is modified only to the extent that the intake header, designated 35a, is positioned in the top wall 12 of the baking chamber and is connected by a shortened intake duct 36a, to its suction-blower, and the length of the outlet duct extension, indicated at 64a, is slightly shortened in length to correspond with the length of outlet duct extension 62a. The blower outlet duct is also slightly shortened in length, as indicated at 44a. Other than these slight differences, the three sets of apparatuses for agitating and circulating air in the baking chamber are identical and are selectively operable identically. Corresponding parts of each of these three sets of apparatuses are, for convenience, accorded the same reference numerals.

It is understood that one or a plurality of separate air agitating apparatuses may be employed in a baking oven, depending upon its size and upon the volume and the character of the foodstuffs to be baked therein. For each set of apparatuses, as above described, all controls are conveniently located outside of the oven and can be readily changed or adjusted at any time, even during the baking operation, in order to obtain the desired conditions of baking, coloring, or browning, and crust formation, of the products, regardless of the products being baked.

By virtue of the arrangement of the blowing tubes and the controls for the tubes and the distributing duct, air may be directed into only certain blowing tubes, and the volume of air permitted to pass into certain of the blowing tubes, and the direction in which air may be discharged from the blowing tubes, makes it possible to obtain relatively fine control of air agitation and circulation, in relatively small zones of a main zone of a baking chamber, which permits great flexibility for quickly and easily making proper adjustments for obtaining the desired baking conditions for various food products.

While we have herein shown and described our novel air agitating and circulating apparatus with respect to baking of foods, it will be apparent that such apparatus could also be satisfactorily employed for treating or drying of various articles. While in the preamble of the claims, reference is specifically made to a baking oven, it is intended that such preamble of the claims shall not of itself be interpreted as limiting the present invention for use in a baking oven for food products.

Although we have herein shown and described a preferred embodiment of our invention, manifestly, it is capable of modification and re-arrangement without departing from the spirit and scope thereof. We do not, therefore, wish to be understood as limiting this invention to the precise embodiment herein disclosed, except as we may be so limited by the appended claims.

We claim:

1. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct and extending longitudinally of said baking chamber and disposed adjacent one side wall of the baking chamber adjacent the path of travel of the products through the baking chamber, and a plurality of rotatable blowing ducts extending transversely of and spaced apart along the length of the baking chamber in close proximity to the path of travel of the products, said blowing ducts each being in open communication at one end with said distributing duct and the opposite end being closed and each having a series of longitudinally spaced apart openings for discharging jets of air under pressure into the baking chamber, the opposite end of each of said blowing ducts extending externally of said oven to form means accessible externally of the oven for independently rotating each of said blowing ducts for controlling the direction of air discharged through said openings.

2. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct and extending longitudinally of said baking chamber and disposed adjacent one side wall of the baking chamber adjacent the path of travel of the products through the baking chamber, and a plurality of blowing tubes extending transversely of and spaced apart along the length of the baking chamber in close proximity to the path of travel of the products, said blowing tubes each being in open communication at one end with said distributing duct and the opposite end being closed and each having a series of longitudinally spaced apart openings for discharging jets of air under pressure into the baking chamber, said communicating ends of said blowing tubes being journal supported in a side wall of the oven, the opposite end of each of said blowing tubes being journaled in an opposed side wall of said oven and extending beyond said opposed wall to form means accessible externally of the oven for independently rotating each tube for controlling the direction of discharge of air through said openings.

3. In combination with a baking oven having a heated baking chamber through which products to be baked are moved therethrough on a conveyor, air agitating apparatus comprising an air intake duct having a header opening into and extending transversely of the baking chamber, a suction-blower connected to the intake duct, said header being provided with inlet openings successively increasing in cross-sectional area transversely of the baking chamber, an air outlet duct connected to the outlet side of the suction-blower, a distributing duct connected to the outlet duct extending longitudinally of and disposed adjacent one side wall of the oven chamber adjacent the path of travel of the products through the baking chamber, a plurality of blowing ducts extending transversely of and spaced apart along the length of the oven chamber in close proximity to the path of travel of the products, said blowing ducts each being in open communication at one end with said distributing duct and the opposite end being closed and each having a series of openings spaced apart along the length thereof for discharging jets of air under pressure into the baking chamber, and means accessible externally of the oven for varying the direction of air flow through said openings.

4. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct extending longitudinally of and disposed adjacent one side wall of the baking chamber in registration with the path of travel of the products through the baking chamber, said distributing duct being partitioned to form a main inlet portion and two superimposed outlet portions positioned respectively above and below the path of travel of the products, a damper for controlling air flow from said main portion into said two outlet portions of the distributing duct, and two vertically spaced apart sets of blowing tubes extending transversely of and spaced apart longitudinally in said baking chamber, said tubes being positioned respectively above and below the path of travel of the products, the sets of tubes being in open communication at one end with the respective outlet portions of the distributing duct and the opposite ends of said tubes being closed, each tube having a series of openings spaced apart along its length for discharging air under pressure toward said products.

5. In combination with a baking oven having a heated baking chamber through which products to be baked are moved therethrough on a conveyor, air agitating apparatus comprising an air intake duct opening into the baking chamber, a suction-blower connected to the intake duct, and air outlet duct connected to the outlet side of a suction-blower, a distributing duct connected to the outlet duct extending longitudinally of and disposed adjacent one side wall of the baking chamber in registration with the path of travel of the products through the baking chamber, said distributing duct being partitioned to form a main inlet portion and two superimposed outlet portions positioned respectively above and below the path of travel of the products, a damper for controlling air flow from said main portion into said two outlet portions of the distributing duct, means accessible externally of the oven, for controlling the position of adjustment of said damper, and two vertically spaced apart sets of blowing tubes extending transversely of and spaced apart longitudinally in said baking chamber, said tubes being positioned respectively above and below the path of travel of the products, the sets of tubes being in open communication at one end with the respective outlet portions of the distributing duct and the opposite ends of said tubes being closed, each tube having a series of openings spaced apart along its length for discharging air under pressure toward said products.

6. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct extending longitudinally of and disposed adjacent one side wall of the baking chamber in registration with the path of travel of the products through the baking chamber, said distributing duct being partitioned to form a main inlet portion and two superimposed outlet portions positioned respectively above and below the path of travel of the products, a damper for controlling air flow from said main portion into said two outlet portions of the distributing duct, two vertically spaced apart sets of blowing tubes extending transversely of and spaced apart longitudinally in said baking chamber, said tubes being positioned respectively above and below the path of travel of the products, the sets of tubes being in open communication at one end with the respective outlet portions of the distributing duct and the opposite ends of said tubes being closed, each tube having a series of openings spaced apart along its length for discharging air under pressure toward said products, and individual damper means for each tube for controlling the amount of air discharged therethrough.

7. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct extending longitudinally of and disposed adjacent one side wall of the baking chamber in registration with the path of travel of the products through the baking chamber, said distributing duct being partitioned to form a main inlet portion and two superimposed outlet portions positioned respectively above and below the path of travel of the products, a damper for controlling air flow from said main portion into said two outlet portions of the distributing duct, means, accessible externally of the oven, for controlling the position of adjustment of said damper, two vertically spaced apart sets of blowing tubes extending transversely of and spaced apart longitudinally in said baking chamber, said tubes being positioned respectively above and below the path of travel of the products, the sets of tubes being in open communication at one end with the respective outlet portions of the distributing duct and the opposite ends of said tubes being closed, each tube having a series of openings spaced apart along its length for discharging air under pressure toward said products, and individual damper means for each tube for controlling the amount of air discharged therethrough.

8. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct extending longitudinally of and disposed adjacent one side wall of the baking chamber in registration with the path of travel of the products through the baking chamber, said distributing duct being partitioned to form a main inlet portion and two superimposed outlet portions positioned respectively above and below the path of travel of the products, a damper for controlling air flow from said main portion into said two outlet portions of the distributing duct, two vertically spaced apart sets of blowing tubes extending transversely of and spaced apart longitudinally in said baking chamber, said tubes being positioned respectively above and below the path of travel of the products, the sets of tubes being in open communication at one end with the respective outlet portions of the distributing duct and the opposite ends of said tubes being closed, each tube having a series of openings spaced apart along its length for discharging air under pressure toward said products, and separate means, associated with each tube, accessible externally of the oven for independently rotating said tubes for controlling the direction of air discharged through the openings of said tubes.

9. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct extending longitudinally of and disposed adjacent one side wall of the baking chamber in registration with the path of travel of the products through the baking chamber, said distributing duct being partitioned to form a main inlet portion and two superimposed outlet portions positioned respectively above and below the path of travel of the products, a damper for controlling air flow from said main portion into said two outlet portions of the distributing duct, two extension duct portions connected to and openly communicating with and constituting longitudinal extensions of said two outlet portions of the distributing duct, and two vertically spaced apart sets of blowing tubes extending transversely of and spaced apart longitudinally in said baking chamber, said tubes being positioned respectively above and below the path of travel of the products, the sets of tubes being in open communication at one end with the respective outlet portions of the distributing duct and said extension duct portions, and the opposite ends of said tubes being closed, each tube having a series of openings spaced apart along its length for discharging air under pressure toward said products.

10. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct extending longitudinally of and disposed adjacent one side wall of the baking chamber in registration with the path of travel of the products through the baking chamber, said distributing duct being partitioned to form a main inlet portion and two superimposed outlet portions positioned respectively above and below the path of travel of the products, a damper for controlling air flow from said main portion into said two outlet portions of the distributing duct, two extension duct portions connected to and openly communicating with, and constituting longitudinal extensions of, said two outlet portions of the distributing duct, two vertically spaced apart sets of blowing tubes extending transversely of and spaced apart longitudinally in said baking chamber, said tubes being positioned respectively above and below the path of travel of the products, the sets of tubes being in open communication at one end with the respective outlet portions of the distributing duct and said extension duct portions, and the opposite ends of said tubes being closed, each tube having a series of openings spaced apart along its length for discharging air under pressure toward said products, and individual damper means for each tube for controlling the amount of air discharged therethrough.

11. In combination with a baking oven having a heated baking chamber through which products to be baked are moved therethrough on a conveyor, air agitating apparatus comprising an air intake duct opening into the baking chamber, a suction-blower connected to the intake duct, an air outlet duct connected to the outlet side of the suction-blower, a distributing duct connected to the outlet duct extending longitudinally of and disposed adjacent one side wall of the baking chamber in registration wtih the path of travel of the products through the baking chamber, said distributing duct being partitioned to form a main inlet portion and two superimposed outlet portions positioned respectively above and below the path of travel of the products, a damper for controlling air flow from said main portion into said two outlet portions of the distributing duct, two extension duct portions connected to and openly communicating with, and constituting longitudinal extensions of, said two outlet portions of the distributing duct, two vertically spaced apart sets of blowing tubes extending transversely of and spaced apart longitudinally in said baking chamber, said tubes being positioned respectively above and below the path of travel of the products, the sets of tubes being in open communication at one end with the respective outlet portions of the distributing duct and said extension duct portions, and the opposite ends of said tubes being closed, each tube having a series of openings spaced apart along its length for discharging air under pressure toward said products, the ends of said tubes being journaled in opposite side walls of the oven, and means externally of the oven for independently rotating each tube for controlling the direction of discharge of air through said openings.

12. In combination with a baking oven having a heated baking chamber through which products to be baked are moved therethrough on a single lap, a horizontally extending conveyor having an upper and a lower run, air agitating apparatus comprising air intake duct means opening into the baking chamber, suction-blower means connected to the intake duct means, air outlet duct means connected to the outlet side of the suction-blower means, distributing duct means extending longitudinally of the baking chamber and connected to the outlet duct means and disposed adjacent the path of travel of the products being moved by the conveyor in the baking chamber, a portion of said distributor duct means being located in the rear half of the baking chamber above and below the conveyor, and portions of said distributor duct means being located respectively in the front and rear halves of the baking chamber above and below the lower run of the conveyor, a plurality of blowing ducts for each portion of said distributing duct means extending transversely of, and spaced apart along the length of the baking chamber in close proximity to the path of travel of the products on the conveyor, said blowing ducts each being in open communication at one end with said distributing duct means, and the opposite end being closed, and each having a series of openings spaced apart along its length for discharging jets of air under pressure into the baking chamber in the general direction of the products being moved by the conveyor.

13. In combination with a baking oven having a heated baking chamber through which products to be baked are moved therethrough on a conveyor, air agitating apparatus comprising an air intake duct opening into the baking chamber, a suction-blower connected to the intake duct and having an outlet side, a distributing duct communicating with the outlet side of the suction-blower and extending longitudinally of said baking chamber and disposed adjacent one side wall of the baking chamber adjacent the path of travel of the products through the baking chamber, a plurality of blowing ducts extending transversely of and spaced apart along the length of the baking chamber in close proximity to the path of travel of the products, said blowing ducts each being journaled for rotation by and in open communication at one end with said distributing duct, and the opposite end being closed and journaled by the opposite side wall of the baking chamber, said ducts having a series of longitudinally spaced apart openings for discharging jets of air under pressure into the baking chamber, individual means connected to an end of said blowing ducts accessible externally of the oven for rotating the latter to control the direction of discharge of said air, individual damper means for each of said blowing ducts, and individual means each including a control positioned externally of the oven, for adjusting said damper means.

14. In combination with a baking oven having a heated baking chamber through which products to be baked are moved on a conveyor, air agitating apparatus comprising an air intake duct opening into the baking chamber, a suction-blower connected to the intake duct and having an outlet side, a distributing duct communicating with the outlet side of the suction-blower extending longitudinally of and disposed adjacent one side wall of the baking chamber adjacent the path of travel of the products through the baking chamber, two vertically spaced apart sets of blowing ducts extending transversely of and spaced apart along the length of the baking chamber, said sets of blowing ducts being located respectively above and below the path of travel of the products, said blowing ducts each being journaled for rotation by and in open communication at one end with said distributing duct, and the opposite end being closed and journaled by the opposite side wall of the baking chamber; said ducts having a series of openings spaced apart along the length thereof for discharging jets of air under pressure into the baking chamber, individual damper means for each of said blowing ducts, separate control means, accessible externally of the oven, for adjusting said damper means for varying the amount of air entering said blowing ducts, and means connected to an end of said blowing ducts and accessible externally of the oven for individually rotating each of said blowing ducts to control the direction of air discharged therefrom.

References Cited in the file of this patent

UNITED STATES PATENTS

| 2,076,415 | Partsch | Apr. 6, 1937 |
| 2,286,049 | Baker | June 9, 1942 |
| 2,604,059 | Warrington | July 22, 1952 |

FOREIGN PATENTS

| 553,807 | Great Britain | June 7, 1943 |